July 1, 1952  M. E. CHANDLER  2,601,976
CARBURETOR
Original Filed Sept. 14, 1943
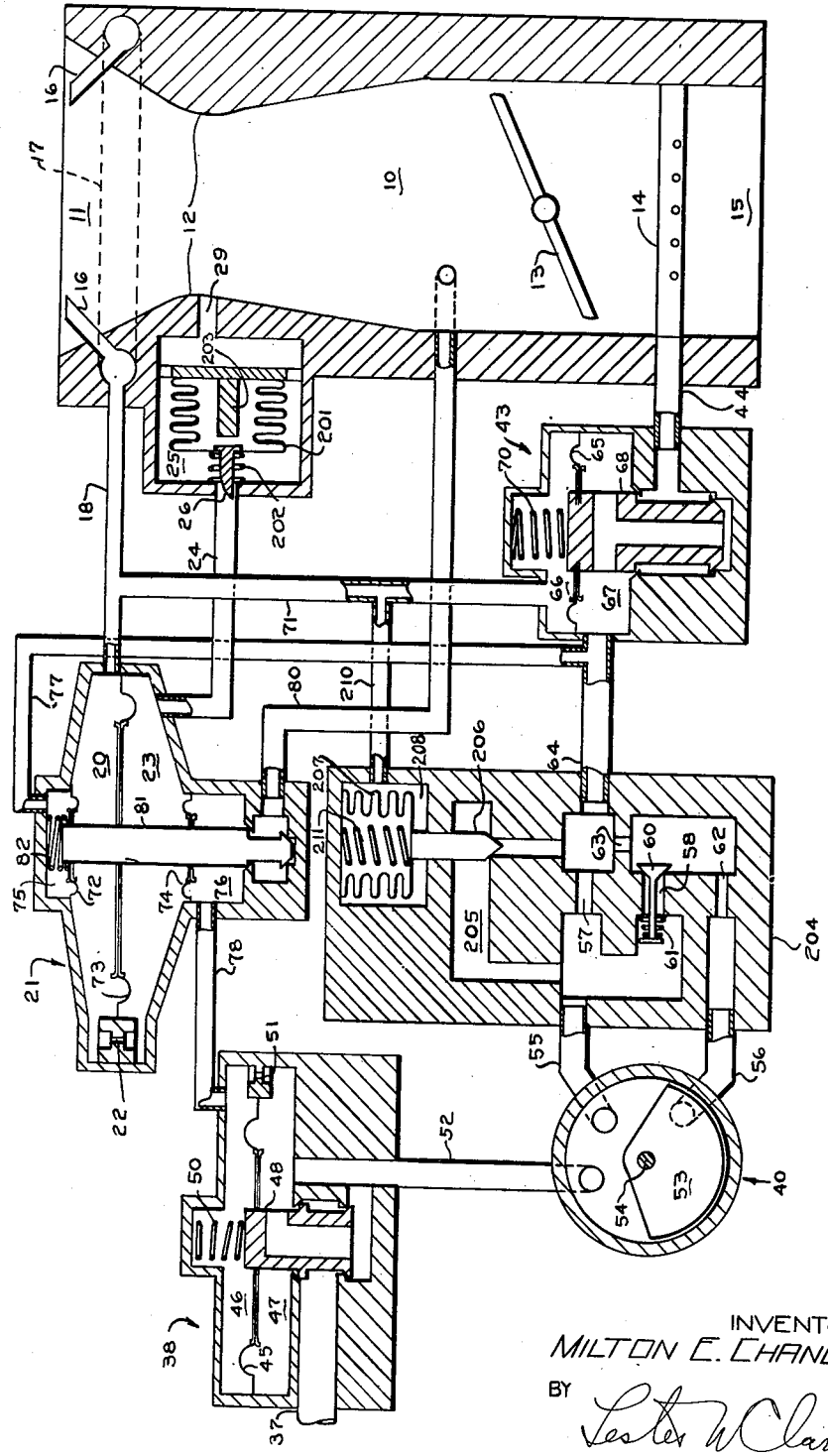
INVENTOR
MILTON E. CHANDLER
BY
Lester W Clark
AGENT Patented July 1, 1952

2,601,976

UNITED STATES PATENT OFFICE 2,601,976

CARBURETOR

Milton E. Chandler, New Britain, Conn., assignor, by mesne assignments, to Niles-Bement-Pond Company, West Hartford, Conn., a corporation of New Jersey Original application September 14, 1943, Serial No. 502,266. Divided and this application July 17, 1946, Serial No. 684,135

12 Claims. (Cl. 261—38)

The present application is a division of application Serial No. 502,266, filed September 14, 1943, matured into Patent No. 2,416,907, dated March 4, 1947.

The present invention relates to carburetors for use with internal combustion engines on aircraft.

In certain types of aircraft carburetors it is customary to measure the quantity of air entering the engine and to control the quantity of fuel supplied to the engine in accordance with the quantity of air so as to maintain a fuel to air ratio which provides predetermined combustion conditions in the engine. The usual method of measuring the air flow is to utilize a Venturi meter. Meters of this type measure the velocity of the flowing air, and are therefore subject to error when the density of the air changes. When such a meter is used on an aircraft, the variation in air density with altitude must be considered in the design of the carburetor, and some means must be provided to compensate for it.

One of the most effective types of altitude compensating arrangements involves the use of a sealed flexible bellows exposed to atmospheric pressure which expands and contracts in accordance with the difference between the internal and external pressures acting on it. Such a bellows may be used to operate a valve or other controlling member to produce a compensating effect either in the air meter or in the fuel flow control mechanism.

Such bellows may be evacuated substantially completely, or they may be filled with fluid. Fluid filled bellows may be classified in three types:

(1) Bellows filled with fluid at less than atmospheric pressure, commonly called "vacuum-filled" bellows, so that when normal atmospheric pressure conditions exist outside the bellows, it is stressed in a sense tending to cause contraction of the bellows;

(2) Bellows filled with fluid at substantially normal atmospheric pressure, commonly called "atmospheric-filled" bellows, so that when normal pressure exists outside the bellows, it is unstressed; and (3) Bellows filled with fluid under a pressure greater than normal atmospheric, commonly called "pressure-filled" bellows, so that when normal atmospheric pressure exists outside the bellows, the bellows is stressed in a direction tending to expand it.

Normal atmospheric pressure is the pressure exerted by the conventional standard atmosphere which, at sea level, is equal to 14.7 pounds per square inch at 15° C.

The fluid with which such a bellows is filled may be chosen to have a suitable temperature coefficient of expansion so that the bellows responds to variations in temperature of the surrounding air as well as to variations in pressure.

A bellows of this type is a relatively delicate structure, and when used on an aircraft where it is subject to considerable vibration, it has been found that leakage of the bellows may occur despite all possible precautions. When such a leak occurs, the internal and external pressures acting on the bellows are equalized. Therefore a bellows filled with fluid under less than atmospheric pressure expands when it leaks whereas a bellows filled with fluid under greater than atmospheric pressure contracts when it leaks. A bellows filled with fluid at normal atmospheric pressure, on the other hand, tends to return to its normal position when it leaks regardless of existing external pressure.

When such a bellows is used to compensate for altitude on an aircraft carburetor, it is essential that the bellows be so arranged, that it will not tend to cause a leaning out of the fuel and air mixture when the bellows leaks. If the fuel and air mixture is made too lean, the motor tends to overheat, with consequent damage to the motor. It is therefore usual to provide a bellows of the type filled with fluid at normal atmospheric pressure for use in compensating the action of an aircraft carburetor for altitude variations.

Since with pressure filled bellows a wider range of temperature and pressure response characteristics are available than with the atmospheric filled type, it is desired to use bellows of the pressure-filled type in aircraft carburetors.

It is therefore an object of the present invention to provide an altitude compensating arrangement for an aircraft carburetor wherein a bellows filled with fluid at a pressure greater than normal, sea-level atmospheric is used, and wherein means is provided to insure that upon leakage of the bellows, the fuel and air mixture supplied to the engine is made richer, rather than leaner.

Another object is to provide an arrangement including a flexible bellows for compensating the action of an aircraft carburetor for changes in altitude and further including means to insure that upon failure of the bellows the altitude compensating means is rendered inoperative in a safe sense.

A further object of the present invention is to provide means including a pressure filled bellows for compensating the action of an aircraft carburetor for altitude variations, and means for limiting the contraction of such bellows upon leakage thereof.

Other objects and advantages of the present invention will become apparent from a consideration of the appended specification, claims and drawing, in which The single figure is a somewhat diagrammatic illustration of an aircraft carburetor including a pressure filled bellows for altitude compensation purposes and embodying the principles of my invention.

Referring to the drawing, there is shown a passage 10 for air flowing thru an aircraft carburetor. Air enters the passage 10 at an inlet 11, and flows past a Venturi restriction 12, a throttle 13 and a discharge nozzle 14 to an outlet 15.

The second air passage connects the inlet 11 and the throat of the Venturi restriction 12. This second passage may be traced from the inlet 11 thru a plurality of impact tubes 16, a passage 17 interconnecting the impact tubes and commonly termed a vent ring, a conduit 18, an expansible chamber 20 in a pressure meter 21, a restriction 22, another expansible chamber 23 in the pressure meter 21, a conduit 24, a chamber 25 and a conduit 29 to the throat of Venturi restriction 12.

The flow of air from conduit 24 into chamber 25 is controlled by a valve 26 which is mounted on the free end of a flexible bellows 201, whose opposite end is fixed inside the chamber 25. The bellows 201 is filled with fluid under pressure greater than normal, sea-level atmospheric so that under normal external air pressure conditions, the bellows 201 tends to expand. If the inherent stiffness of the bellows is not sufficient to resist this expansive force, a spring 202 may be provided to oppose it. It may be seen that if the bellows 201 leaks the equalization of the external and internal pressures causes the bellows to collapse. The collapsing of bellows 201 is limited by a stop 203, which is preferably positioned so that the bellows cannot collapse beyond the position it assumes when the external air pressure is at the normal atmospheric value.

The total pressure drop between the inlet 11 and the throat of the venturi 12 may be separated into two components, one appearing across restriction 22 and the other across valve 26. As the altitude of the aircraft increases, the bellows 201 expands. Expansion of bellows 201 moves valve 26 in a closing direction thereby restricting the flow of air thru the second passage previously traced. As the valve 26 is moved toward closed position with increasing altitude, a greater proportion of the total pressure drop takes place across valve 26 and a smaller proportion across restriction 22. It is this pressure drop across restriction 22 which is effective in the pressure meter 21 as a measure of the mass of the flowing air. The function of bellows 201 and valve 26 is to maintain a pressure differential between chambers 20 and 23 of pressure meter 21 which is substantially a true indication of the mass of air flowing thru the passage 10.

Since the pressure differential produced by a Venturi restriction varies with the velocity of the air, it may be seen that, for a constant mass of air flowing per unit time, a decrease in density of the air causes the venturi to create a higher differential pressure. In order to secure a differential pressure which is an accurate measure of the mass of air flowing, the bellows operated valve 26 is provided, and it responds to a decrease in air density so as to reduce the proportion of the total pressure drop between the inlet 11 and the throat of Venturi restriction 12 which is used as a measure of the mass of the flowing air in the pressure meter 21.

The fuel flowing thru the carburetor comes from a pump or other source of fuel under pressure (not shown). From this source, the fuel flows thru a conduit 37, a fuel regulator valve 38, a mixture control unit 40, a jet system 204, a conduit 64, a pressure regulator 43 and a conduit 44 to the discharge nozzle 14.

The fuel regulator 38 includes a casing divided by a flexible diaphragm 45 into a pair of expansible chambers 46 and 47. The diaphragm 45 carries at its center a valve 48, which is balanced against inlet pressure, and is biased toward open position by a spring 50. A restriction 51 interconnects the chambers 46 and 47. The pressure in chamber 47 is the pressure at the outlet of the valve 48, while the pressure in chamber 46 is controlled by the pressure meter 21 in a manner to be hereinafter described.

A conduit 52 conducts fuel from the fuel regulator 38 to the mixture control unit 40. The mixture control unit 40 includes a disc valve 53 rotatable by means of a shaft 54 to open and close ports connected to conduit 52 and to a pair of conduits 55 and 56 extending to the jet system 204. When the disc valve member 53 is in the position shown in the drawing, fuel may enter the jet system 204 only thru the conduit 55. The mixture control valve is then said to be in its lean position. If the mixture control valve is rotated so that both the conduits 55 and 56 are open, the mixture control valve is said to be in its rich position. If the valve 53 is rotated so that both conduits 55 and 56 are closed, the mixture control is said to be in its cut-off position.

Fuel entering the jet system 204 thru the conduit 55 may flow either thru a fixed restriction or jet 57 or thru a restriction or jet 58 controlled by a poppet valve 60 biased to closed position by means of a spring 61. Fuel entering the jet system 204 thru the conduit 56 flows thru a fixed restriction 62. Fuel flowing thru the restrictions 58 and 62 passes thru an additional limiting restriction 63 before passing out of the jet system thru a conduit 64.

An additional passage 205 is provided in parallel with the restriction 57. The passage 205 is normally closed by valve 206, which is operated by a bellows 207. The bellows 207 is positioned in a chamber 208 connected thru a conduit 210, conduit 71, conduit 18, vent ring 17 and impact tubes 16 to the inlet 11. The bellows 207 may be filled with fluid at any desired pressure, and may if desired be provided with an internal spring 211. The bellows 207 is designed so that the valve 206 is closed at all values of pressure in the chamber 208 equal to normal, sea-level atmospheric or less. As the pressure in chamber 208 increases above normal, sea-level atmospheric, the bellows 207 contracts, thereby opening the valve 206 to increase the quantity of fuel supplied to the engine in proportion to the increase in the density of the air.

The pressure regulator 43 includes a casing divided by a flexible diaphragm 65 into a pair of expansible chambers 66 and 67. The diaphragm 65 carries at its center a valve 68, which is biased toward closed position by a spring 70. Altho the valve 68 is illustrated as being balanced against outlet pressure, it is not necessary that a balanced valve be used when the fuel flow is controlled by a pressure meter such as that indicated at 21, as explained hereinafter. The chamber 66 is connected thru a conduit 71 and the conduit 18, vent ring 17 and the impact tubes 16 to atmospheric pressure at the inlet 11. This connection is merely to permit free movement of the diaphragm 65 without compressing the fluid in the chamber 66. Since the chamber 66 is supplied with air at atmospheric pressure, the spring 70 acts to maintain a pressure greater than atmospheric in the chamber 67. The fuel supplied to the discharge nozzle 14 is therefore always under pressure and any tendency of the fuel to vaporize in the conduit 44 or in the nozzle 14 is minimized.

The pressure meter 21 includes a casing divided by three flexible diaphragms 72, 73 and 74 into four expansible chambers 75, 20, 23 and 76. The connections of chambers 20 and 23 have already been described. The chamber 75 is connected thru a conduit 77 to the conduit 64 in the fuel line downstream from the jet system 204. The chamber 76 is connected thru a conduit 78 to the chamber 46 in the fuel regulator 38.

A portion of the fuel entering chamber 47 of the fuel regulator 38 passes thru restriction 51, chamber 46, conduit 78, chamber 76 of pressure meter 21, and thru a conduit 80 to a drain in the air passage 10.

The pressure meter 21 also includes a valve member 81 attached to the diaphragms 72, 73, and 74, and biased to closed position by a spring 82. The valve 81 controls the pressure in chamber 76 and hence the pressure in chamber 46 of fuel regulator 38.

It may be seen that upon an increase in the quantity of air flowing thru the passage 10, the pressure differential between chambers 20 and 23 is increased, thereby moving the valve 81 in a closing direction and increasing the pressure in chamber 76. The closing movement of valve 81 continues until the pressure in chamber 76 has increased sufficiently to balance the increase in the force acting on diaphragm 73 due to the increased air pressure differential.

The increase pressure in chamber 76 is transmitted to chamber 46 of the fuel regulator 38, where it acts on diaphragm 45 in a direction to open the valve 48 and increase the flow of fuel to the carburetor so as to maintain the desired fuel to air ratio.

The quantity of fuel entering the carburetor is determined by the pressure differential across the jet system. The pressure upstream from the jet system is regulated by the fuel regulator 38 in accordance with the quantity of air entering the carburetor, in the manner just described. If the pressure downstream from the jet system varies, that variation is communicated thru conduit 77 to the chamber 75 in pressure meter 21, where it acts on the valve 81 in a direction to produce a balancing change in the pressure upstream from the jet system. For example, if the pressure downstream from the jet system decreases for any reason, the decrease in pressure is communicated to chamber 75, causing an opening movement of valve 81, thereby decreasing the pressure in chamber 76 of pressure meter 21 and in chamber 46 of fuel regulator 38, thereby causing a closing movement of valve 81 and a decrease in pressure upstream from the jet system.

The spring loaded valve 60 controlling the fuel flow thru restriction 58 is provided to increase the fuel to air ratio whenever the pressure differential across the jet system exceeds a value determined by the strength of spring 61. This increase in the fuel to air ratio causes the engine to run on a rich mixture whenever high power output is required of the engine.

When the aircraft is operating at sea level, the pressure at the vent ring 17 is greater than ambient atmospheric because of the impact or ram of the rapidly moving air entering the impact tubes 16. This impact or ram may be due in part to the airspeed of the plane and in part to a supercharger, if one is used. If the stop 203 is designed to prevent a contraction of the bellows beyond the position assumed when the pressure at inlet 11 is atmospheric, then the valve 26 will not be operated to properly control the fuel to air ratio when the pressure at inlet 11 is greater than atmospheric.

It may therefore be seen that the bellows operated valve 206 compensates the carburetor for changes in atmospheric pressure above a predetermined value, which may be normal atmospheric pressure at sea level, and that the bellows operated valve 26 compensates the action of the carburetor for changes in atmospheric pressure below that predetermined value. Furthermore, it may be seen that upon leakage of the bellows 201 the air pressure compensation is discontinued for all values of air pressures below atmospheric, but still remains effective for air pressures greater than atmospheric. The error in the lack of atmospheric pressure compensation is in the safe direction, since it tends to make the fuel to air ratio richer at low air pressures.

If the bellows 207 is also provided with a pressure type fill, it may be seen that if that bellows fails the valve 206 will be opened, thereby further varying the fuel to air ratio in the direction of safety.

While I have shown and described certain preferred embodiments of my invention, other modifications thereof will readily occur to those skilled in the art, and I therefore intend that my invention shall be limited only by the appended claims.

I claim as my invention:

1. In a carburetor for an internal combustion engine, in combination, a first conduit for air flowing to said engine for combustion purposes, means associated with said first conduit for producing two unequal pressures whose difference is a function of the velocity of the air flowing therethru, a second conduit in which a flow of air is produced by said unequal pressures, a fixed restriction in said second conduit, a variable restriction in said second conduit, means including a flexible bellows and a first valve movable thereby for varying said variable restriction so as to produce across said fixed restriction a pressure differential proportional to the mass of air flowing thru said first conduit, said flexible bellows having its exterior exposed to a pressure varying in accordance with atmospheric pressure and containing an expansible fluid at a pressure substantially greater than normal sea level atmospheric pressure so that the difference between said exterior and interior pressures tends to expand said bellows and close said valve, stop means for limiting the contraction of said bellows so that said valve cannot open beyond a predetermined point upon leakage of said bellows, a fuel conduit including at least two parallel branches, means responsive to said pressure differential to control the flow of fuel thru said fuel conduit, a second valve in one of said branches, means biasing said second valve to closed position, and means for opening said second valve in response to variations in air density only above the value corresponding to the limiting position of said first valve, to compensate the action of said flow controlling means for such density variations.

2. In a carburetor for an internal combustion engine, in combination, a first conduit for air flowing to said engine for combustion purposes, means associated with said first conduit for producing therein two unequal pressures whose difference is a function of the velocity of the air flowing therethru, combustion air density compensating means comprising: means responsive to said pressure differential to control the flow of fuel to said engine; a second conduit in which a flow of air is produced by said unequal pressures, a fixed restriction in said second conduit, a variable rstriction in said second conduit, means including a flexible bellows and a valve movable thereby for varying said variable restriction so as to produce across said fixed restriction a pressure differential proportional to the mass of air flowing thru said first conduit, said flexible bellows having its exterior exposed to a pressure varying in accordance with atmospheric pressure and containing an expansible fluid at a pressure substantially greater than normal sea level atmospheric pressure so that the difference between said exterior and interior pressures tends to expand said bellows and close said valve, stop means for limiting the contraction of said bellows so that said valve cannot open beyond a predetermined point corresponding to the position which said valve assumes when the external air pressure is at normal sea level atmospheric value, whereby the density of said combustion air is not compensated by said valve for variations in density at pressures above normal sea level atmospheric value.

3. In a carburetor for an internal combustion engine, in combination, a first conduit for air flowing to said engine for combustion purposes, means associated with said first conduit for producing two unequal pressures whose difference is a function of the velocity of the air flowing therethru, a second conduit in which a flow of air is produced by said unequal pressures, a fixed restriction in said second conduit, a variable restriction in said second conduit, means including a flexible bellows and a valve movable thereby for varying said variable restriction in response to variations in air density below a predetermined value only, so as to produce across said fixed restriction a pressure differential proportional to the mass of air flowing thru said first conduit below said predetermined value, said flexible bellows having its exterior exposed to a pressure varying in accordance with atmospheric pressure and containing an expansible fluid at a pressure substantially greater than normal sea level atmospheric pressure so that the difference between said exterior and interior pressures tends to expand said bellows and close said valve, stop means for limiting the contraction of said bellows so that said valve cannot open beyond a point corresponding to said predetermined value, means responsive to said pressure differential to control the flow of fuel to said engine, and means for additionally controlling the fuel flow in response to variations in air density above said predetermined value only, to compensate the action of said flow controlling means for such density variations above said predetermined value.

4. In a carburetor for an internal combustion engine, in combination, a first conduit for air flowing to said engine for combustion purposes, means associated with said first conduit for producing two unequal pressures whose difference is a function of the velocity of the air flowing therethru, a second conduit in which a flow of air is produced by said unequal pressures, a fixed restriction in said second conduit, a variable restriction in said second conduit, means including a flexible bellows and a first valve movable thereby for varying said variable restriction so as to produce across said fixed restriction a pressure differential proportional to the mass of air flowing thru said first conduit, said flexible bellows having its exterior exposed to a pressure varying in accordance with atmospheric pressure and containing an expansible fluid at a pressure substantially greater than normal sea level atmospheric pressure so that the difference between said exterior and interior pressures tends to expand said bellows and close said valve, stop means for limiting the contraction of said bellows so that said valve cannot open beyond a predetermined point, a fuel conduit including at least two parallel branches, means responsive to said pressure differential to control the flow of fuel thru said fuel conduit, a second valve in one of said branches, a second flexible bellows connected to said second valve, said second bellows having its exterior exposed to the pressure at the entrance to said first air conduit and containing an expansible fluid at a pressure substantially greater than its associated exterior pressure so that the difference between said exterior and interior pressures tends to expand said bellows and close said valve, said second bellows being effective only upon increase of said entrance pressure above a predetermined value corresponding to the pressure conditions at which said first bellows engages said stop means, to open said second valve and said second bellows also being effective upon equalization of its interior and exterior pressures due to leakage to open said second valve.

5. In a carburetor for an internal combustion engine, a first conduit for air flowing to said engine for combustion purposes, a fuel conduit including at least two parallel restrictions, means responsive to the quantity of air flowing thru said air conduit for controlling the pressure differential across said restrictions so as to control the flow of fuel thru said fuel conduit, a first valve in one of said restrictions, a first flexible bellows connected to said valve, said bellows having its exterior exposed to atmospheric pressure and containing an expansible fluid at a pressure greater than normal sea level atmospheric pressure so that the difference between said exterior and interior pressures tends to expand said bellows and close said valve, a second valve in said fuel conduit operated by a second bellows which is adapted, upon increase in said atmospheric pressure above a predetermined value at which said first valve closes, to open said second valve, said second bellows being also adapted upon equalization of its interior and exterior pressures due to leakage to open said second valve.

6. A carburetor according to claim 1, wherein said predetermined point beyond which said first valve cannot open is that corresponding to the normal working position of said valve for normal, sea level atmospheric pressure.

7. A carburetor according to claim 3, wherein said predetermined point beyond which said valve cannot open is that corresponding to the normal working position of said valve for normal, sea level atmospheric pressure.

8. A carburetor according to claim 5, wherein said predetermined value at which said bellows normally opens said second valve is normal, sea level atmospheric pressure.

9. A carburetor according to claim 1, wherein the means for opening said second valve is actuated solely by the pressure and density of the air entering the carburetor.

10. A carburetor according to claim 3, wherein the means for compensating the action of said flow controlling means is actuated solely by the pressure and density of the air entering the carburetor.

11. In a carburetor for an internal combustion engine, an air conduit for supplying combustion air to said engine, a fuel supply conduit having at least three parallel restrictions therein, means responsive to the mass air flow through said air conduit for controlling the pressure differential across said restrictions; an enrichment valve adapted to close one of said restrictions until said pressure differential exceeds a predetermined value; and a second valve, operated by a bellows responsive to exterior atmospheric pressure, adapted to close another of said restrictions and to open said restriction only upon an increase of said atmospheric pressure above a predetermined value; said bellows being adapted upon equalization of its interior and exterior pressure due to leakage to open said second valve.

12. A carburetor according to claim 11, wherein said second valve opens whenever said exterior atmospheric pressure exceeds normal, sea level pressure.

MILTON E. CHANDLER.

REFERENCES CITED

The following references are of record in the file of this patent:

UNITED STATES PATENTS

| Number | Name | Date |
| --- | --- | --- |
| 2,155,950 | Nallinger | Apr. 25, 1939 |
| 2,227,267 | Lozivit | Dec. 31, 1940 |
| 2,411,287 | Mock | Nov. 19, 1946 |
| 2,426,741 | Mock | Sept. 2, 1947 |